April 26, 1938.  W. H. PRATT  2,115,589
INDUCTION WATT-HOUR METER
Filed Feb. 9, 1937  2 Sheets-Sheet 1

Inventor:
William H. Pratt,
by Harry E. Dunham
His Attorney.

April 26, 1938.   W. H. PRATT   2,115,589
INDUCTION WATT-HOUR METER
Filed Feb. 9, 1937   2 Sheets-Sheet 2

Inventor:
William H. Pratt,
by Harry E. Dunham
His Attorney.

Patented Apr. 26, 1938

2,115,589

UNITED STATES PATENT OFFICE 2,115,589

INDUCTION WATT-HOUR METER

William H. Pratt, Lynn, Mass., assignor to General Electric Company, a corporation of New York Application February 9, 1937, Serial No. 124,828

5 Claims. (Cl. 171—264)

My invention relates to induction meter devices, such as watt-hour meters, reactive component meters, and relays employing an induction meter operating element. Its object is to provide an induction watt-hour element of compact, rugged construction, having high torque and sustained high accuracy at reasonable cost.

Figure 1:
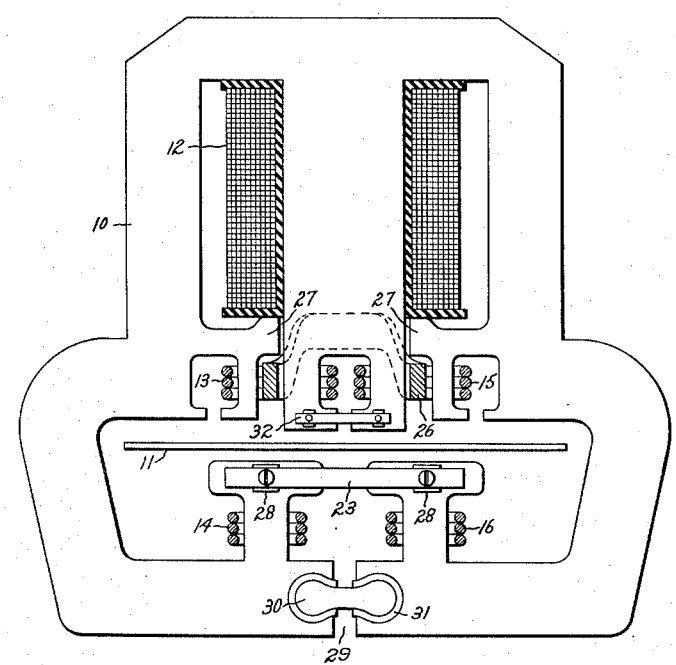
Figure 2:
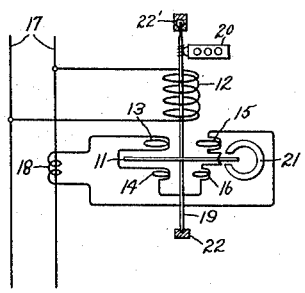
Figure 5:
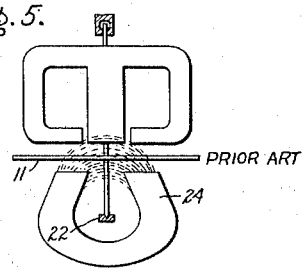
Figure 3:
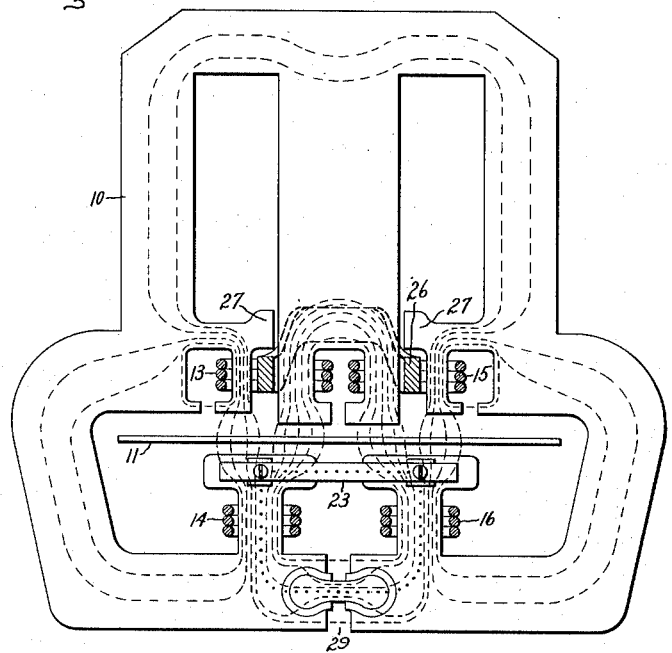
Figure 4:
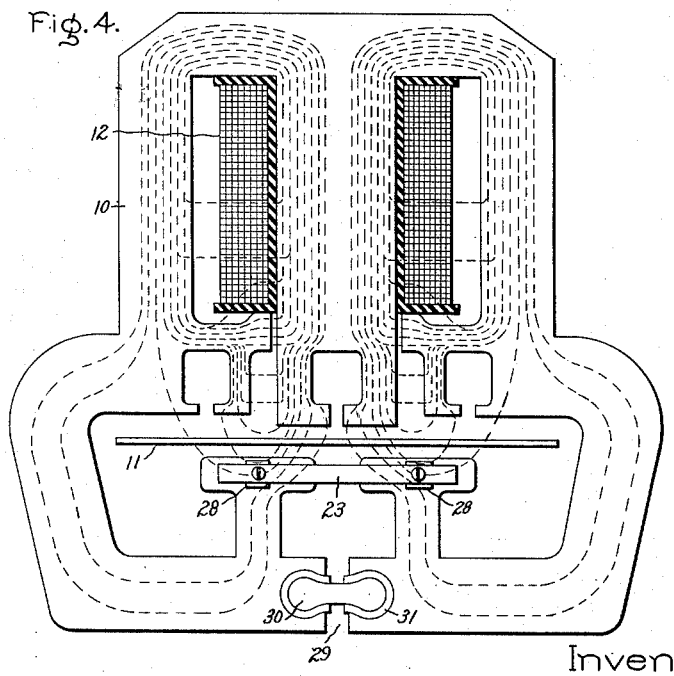

The features of my invention which are believed to be novel and patentable will be pointed out in the claims appended hereto. For a better understanding of my invention, reference is made in the following description to the accompanying drawings in which Fig. 1 illustrates a side view of an induction wattmeter element embodying my invention; Fig. 2 shows the circuit connections for the same; Fig. 3 illustrates the approximate distribution of the current flux; Fig. 4 illustrates the approximate distribution of the potential flux; and Fig. 5 is a diagram explanatory of current repulsion forces on the armature, which are avoided by my invention. The invention concerns primarily the magnetic circuit structure of the meter and the arrangement of coils thereon and, in Figs. 1, 3, and 4, meter parts, which are unnecessary to illustrate the important features of the present invention, have been omitted.

In Fig. 1, it will be noted that the magnetic circuit is made up of laminations 10 which may be stamped out in one piece; that is, the entire magnetic circuit is made up of one piece laminations so that it is unnecessary to provide special clamps or other fastening means between that portion of the magnetic structure below the disk 11 and that portion above the disk, for example. This magnetic circuit is energized by the potential or voltage coil 12 and four current coils 13, 14, 15, and 16. The four current coils are intended to be connected in series for the usual installation. The usual single phase circuit connections of the meter are indicated in Fig. 2, where the voltage coil 12 is shown connected across the circuit 17 and the four current coils of the meter are connected in series with the secondary of a current transformer 18, the primary of which is energized by the current flowing in the circuit 17.

In Fig. 2, 19 represents the meter shaft, 20 a register for counting the revolutions of the shaft, 21 the damping magnet embracing the armature disk 11 of conducting material, and 22 and 22' the lower and upper bearings for the meter. It will be understood that the fluxes produced through the armature disk by the current and voltage windings produce a torque and speed proportional to the energy flowing in circuit 17 in the usual case where the meter is connected and designed to measure watt hours.

An important aspect of my invention is in dividing the current winding of the meter into approximately equal sections, which are placed on opposite sides of the armature disk 11. Thus, current coils 13 and 15 are above the disk and current coils 14 and 16 are below the disk, and the number of ampere turns of the current winding above and below the disk are substantially the same, so that the upper and lower groups of current coils contribute approximately equally to the production of the current flux through the disk. This arrangement assures that a very high percentage of the current flux will cut the disk and be utilized in producing torque. It provides a somewhat better ventilation of the current winding than is the case where the same or a greater amount of winding is contained in a single coil, or in two coils on one side of the disk. For these reasons, the ampere turns and the size of wire used in the current winding may be reduced to a minimum. The coils 13 and 14 are connected to produce flux in one direction through the disk and the coils 15 and 16 are connected to produce flux in the opposite direction through the disk, as indicated in the approximate current flux distribution representation of Fig. 3. It will be noted from Fig. 3 that all of the current flux except that utilized for load compensation through the saturable shunt 23 cuts the armature 11.

Perhaps the most important advantage of thus dividing the current winding into sections above and below the disk is the protection it affords to the meter pivots and bearings should the meter be subjected to sudden heavy current surges. In watt-hour meters where the current winding is placed all on one side of the armature, it has been found that a sudden heavy current surge may force the armature in the direction of its axis away from the current magnet. I do not have reference here to the ordinary alternating-current pulsation of normal value, since their repulsion effects on the armature are insufficient to force the rotary member of the meter endwise. I have reference rather to heavy current surges, such as may be caused by an occasional severe short circuit or other abnormal condition, which cause the current flux of the meter to momentarily rise to several times normal full-load value. This action, as it is understood, may be visualized with the aid of Fig. 5 showing a watt-hour meter magnet assembly where the current magnet 24 is below the disk 11. The dotted lines between the poles of the current magnet 24 represent in general the path of the current flux in such a meter. When this flux is increasing, some of it cuts the disk 11 and induces a current therein, which current, in turn, reacts against the primary current flux. The net result is that there is an upward acting force on the armature, which seeks to lift the armature out of the intense primary current flux field and under severe short circuit load conditions actually does lift the armature. Primarily, as a result of such abnormal condition, it sometimes happens that the armature shaft is lifted off the bottom step bearing jewel and is then dropped back again, causing more or less damage to the delicate step bearing pivot or jewel or both. The meter will ordinarily continue to run and the damage, if any, goes unnoticed and indeed oftentimes can only be detected by a microscopic examination of the bearings, or a careful light load accuracy test of the meter. The friction constants of the meter, however, have probably changed, the armature position may have been slightly lowered, and the upper guide bearing pin may have been bent, causing added friction and improper alignment of the rotary element. The chances are that the meter is no longer accurate and that its degree of inaccuracy is unknown.

Another result of placing the current winding all on one side of the armature is that on heavy loads, well within the measurement range of the meter, there is sometimes an objectionable hum due to vibrations of the armature disk as it is acted upon by the forces above described, even though such forces are insufficient to actually lift the rotor assembly.

One way of minimizing the above described detrimental results is to make the rotor assembly of the meter sufficiently heavy so that the forces in question will not lift it off the step bearing or cause the armature to vibrate. This is undesirable because of increased continuous bearing wear and friction and for other reasons. It does not remove the cause of the trouble.

The division of the current winding into two substantially equal parts placed above and below the armature in accordance with my invention effectively removes the cause of the trouble because now the force acting axially of the armature disk due to sudden abnormally heavy current changes is absent or, if considered to be present, is divided into two substantially equal and opposite parts having no tendency to move the armature endwise. The current flux distribution in the armature air gap, according to my invention, is materially changed from that represented in Fig. 5 and is substantially like that depicted in Fig. 3. An endwise movement of the armature in the field of Fig. 3 neither increases nor decreases the number of current flux lines which it intercepts and, consequently, there is no tendency for it to move endwise due to a change in the current flux density. Fig. 3 is intended to represent in general the flux distribution due to normal load current conditions. For an abnormally heavy sudden current surge, it may be visualized that some of the flux produced by the upper current coils 13 and 15 and some of the flux produced by the lower current coils 14 and 16 will be turned back by the heavy current induced in the armature, and that such portions of the fluxes will then cross between the pole tips of the two current magnets above and below the armature and produce two simultaneous repulsion effects on the armature analogous to the single repulsion effect explained in connection with Fig. 5 but with a totally different result. The two simultaneous repulsion effects on the armature with the arrangement of Fig. 3 will be substantially equal and opposite at all times with no tendency to move the armature either up or down. The possibility of damage to the bearing surfaces and the possibility of misplacement of the armature due to abnormal current surges are thus eliminated.

The closed conductor for lagging the potential flux is represented at 26 surrounding the central leg of the voltage magnet. It is shown in section as are the current coils. Those side portions of the lag coil that lie between the middle leg of the voltage magnet and the two extensions from the outer legs of the voltage magnet are approximately in the center of the two current coils 13 and 15, and the side portions of the lag coil are bent upward so as to clear the turns of the current coils. This arrangement allows the portions 27 of the inwardly extending legs of the voltage magnet to approach closely to the middle leg to the extent which is desirable in a properly designed voltage magnetic structure for this type and purpose. The sections of the middle and inwardly extending limbs of the potential magnet adjacent the armature disk have slots facing the armature in which the current coils are wound so that the structure of the potential magnet adjacent the armature is designed to accomplish the usual potential flux distribution and, at the same time, to serve as a current magnet of generally U-shape for that portion of the current winding located above the disk. It will be noted from Figs. 3 and 4 that the lag coil 26 is cut by the torque-producing portion of the potential flux but that it is not actually cut by any of the current flux, and thus it is properly arranged to bring about the desired phase angle between the current and potential fluxes.

The part 23 is a saturable magnetic shunt extending between the pole tips of the lower current magnet. This shunt is magnetically spaced from such pole tips by nonmagnetic spacers 28. The lower current magnet preferably contains an air gap formed by the spacing at 29 and the magnetic fastening piece 30 which is separated from the current core laminations by nonmagnetic spacer parts 31. This arrangement is for overload compensation in accordance with the teachings of United States Patent No. 1,727,509, September 10, 1929, Kurz et al. During medium loads, the shunt 23 operates below saturation. On overloads, it becomes saturated and is thus caused to shunt a variable percentage of the current flux from the armature and improve the load curve of the meter. The gaps at 29, 31 increase the reluctance of the current flux path and contribute to the desired result. The flux through shunt 23 is indicated by the round dotted line in Fig. 3. Where necessary, a second shunt for the same purpose may be used in connection with the upper current magnetic circuit as indicated at 32 in Fig. 1. The shunt 32 may be designed to become saturated at a somewhat smaller current load than the shunt 23 and, in this way, the control of the exactness and range of overload compensation may be extended over that obtainable with a single shunt. Such load-compensating shunt or shunts are ineffectual at the heavy currents that have heretofore occasioned axial displacement of the armature disk and so will not appreciably disturb the equality of the maximum current fluxes through the armature as produced by the upper and lower current coils.

As will be evident from Fig. 4, the potential flux has in general two parallel paths, one of which cuts the disk armature 11 and the other of which is through the inwardly extending legs 27 of the potential magnet. The potential flux paths through 27 may, therefore, be designed to operate above the maximum permeability curve of the magnetic material, and the potential flux path through the armature may be designed to operate below the maximum permeability curve of the magnetic material, both paths operating below saturation. Such an arrangement compensates the meter for errors due to the damping effect of the potential flux with changes in voltage, as explained in United States Patent No. 1,771,929, Kinnard, July 29, 1930, and permits of using a high ratio of potential flux to current flux under normal conditions. That is, the useful voltage flux may be not less than four times the useful current flux through the armature. It is thus seen that the manner in which I have divided the current flux-producing winding on opposite sides of the armature does not prevent the use of the desirable improvements described in the previously mentioned patents.

Such a meter as I have described will, therefore, have inherent high accuracy over wide ranges of voltage and current variation. It will be quiet in operation on overloads. If subjected to a severe short-circuit overload, its accuracy will not be diminished by damaged bearings or displacement of the armature. Moreover, the one piece laminated construction of the entire magnetic circuit permits of a rugged, low cost construction.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. An induction meter comprising a disk of conducting material, a shaft rotatively supporting said disk, bearings for said shaft, and a magnetic circuit made up of one piece laminations, said circuit including an air gap in which said disk is located, a potential winding on one portion of said magnetic circuit, and a current winding for said meter for producing in-phase current fluxes across said air gap through said disk, said winding comprising series connected coils wound on other portions of said magnetic circuit on axially opposite sides of said disk and arranged to produce a current flux that cuts the disk twice in opposite directions, the current coils on opposite sides of the disk contributing substantially equally to the current flux through the disk, whereby any forces acting on said disk in an axial direction as a result of the fluxes produced by such current coils are substantially equally balanced.

2. An induction meter comprising a rotary disk of conducting material, a laminated magnetic structure forming an E-shaped voltage magnet on one side of the disk with the open end of the E facing the disk, a voltage coil on the central leg of the E, the end extremities of the three legs of the E-shaped voltage magnet each having slots facing the disk, a pair of current coils wound in said slots, both such current coils having a coil side in the slot of the central leg of the E-shaped voltage magnet, the arrangement providing a generally U-shaped current magnetic circuit with its open end facing the disk, a second U-shaped current magnetic circuit on the opposite side of and with its open end facing the disk opposite the first mentioned current magnetic circuit, and a pair of current coils on the limbs of said second U-shaped current magnetic circuit, all of said current coils being connected in series to circulate a current flux in series relation through the two U-shaped current magnetic circuits and through the disk, the current coils on opposite sides of the disk contributing substantially equally to the production of the current flux through the disk.

3. An induction type watt-hour meter having a rotatably mounted armature, a voltage electromagnet, and a current electromagnet for producing voltage and current fluxes through said armature, said current electromagnet being divided into a pair of substantially U-shaped magnetic circuits on axially opposite sides of the armature with the open portion of the U's facing the armature opposite each other and with a current coil on each leg of each U-shaped magnetic circuit, said coils being connected in series to produce a current flux that flows serially through both U-shaped magnetic circuits and cuts the armature in opposite directions, the portions of the electromagnet on opposite sides of the armature contributing substantially equally to the production of such flux, and means for shunting a small variable portion of the flux produced by said current electromagnet away from the armature to provide load compensation for such meter.

4. An induction type watt-hour meter comprising a rotatably mounted armature and voltage and current electromagnets for producing voltage and current fluxes through said armature, the current electromagnet being divided into two portions on axially opposite sides of the armature, each of such portions contributing substantially equally to the production of current flux that cuts the armature twice in opposite directions, and each such portion being provided with a saturable shunt of magnetic material that shunts relatively small variable portions of the current flux produced by such portions away from the armature for overload compensation of said meter, said saturable shunts becoming saturated at different higher than normal load current values of the meter.

5. An induction type watt-hour meter having a rotatable armature and voltage and current electromagnets for producing voltage and current fluxes through the armature, said voltage electromagnet being compensated to substantially eliminate voltage flux damping errors and produce not less than four times as much useful flux through the armature as is produced by the current electromagnet at normal voltage and current, said current electromagnet being divided into two approximately equally effective sections which are on axially opposite sides of the armature and each of which produces current flux that cuts the armature twice in opposite directions, at least one of said sections being provided with a saturable magnetic shunt which diverts a small variable portion of the current flux produced by such section away from the armature to provide load compensation for said meter.

WILLIAM H. PRATT.